June 19, 1951  E. R. GILLILAND  2,557,650
METALLURGICAL PROCESS

Filed July 30, 1948  3 Sheets-Sheet 1

Edwin R. Gilliland Inventor
By J. Cashman Attorney

June 19, 1951  E. R. GILLILAND  2,557,650
METALLURGICAL PROCESS

Filed July 30, 1948  3 Sheets-Sheet 2

Edwin R. Gilliland Inventor
By J. Coelman Attorney

June 19, 1951  E. R. GILLILAND  2,557,650
METALLURGICAL PROCESS
Filed July 30, 1948  3 Sheets-Sheet 3

Edwin R. Gilliland Inventor
By J. Cushman Attorney

Patented June 19, 1951

2,557,650

UNITED STATES PATENT OFFICE 2,557,650

METALLURGICAL PROCESS

Edwin R. Gilliland, Arlington, Mass., assignor to Standard Oil Development Company, a corporation of Delaware Application July 30, 1948, Serial No. 41,667

22 Claims. (Cl. 75—40)

The present invention relates to a process and apparatus for reducing metal ores and purifying the reduced metal by smelting. More specifically, the invention refers to improved means by which ore reduction and metal smelting may be carried out continuously in a single treating stage using a single integrated metallurgical unit. The invention is particularly applicable to the oxidic ores of those metals which are readily oxidizable at elevated temperatures, such as iron.

In the copending Gilliland application, Serial No. 751,760 filed June 2, 1947, now Patent No. 2,526,472, an open hearth furnace type process and apparatus for the smelting of iron-type metals are disclosed, in which powdered impure metal is introduced into the molten slag forming the top layer of the furnace charge, to be melted therein, and the heat required for melting the metal is supplied by continuously circulating the slag through a separate heating zone, sufficient time being allowed for the molten metal to settle out of the slag into the lower molten metal layer before the slag enters the heating zone. As shown in said copending application, this procedure makes possible the melting of powdered impure iron-type metals while at the same time permitting maximum utilization of fuel and control of the carbon content of the metal, independently of the combustion required to supply the necessary heat.

It has now been found that the same principle may be applied to the substantially simultaneous reduction and melting of oxidic iron-type metal ores, in such a manner that purified metal of the pig iron or steel type may be obtained directly from the oxidic ore in a single integrated unit.

In accordance with the present invention, the oxidic metal ore and the reducing agent are introduced into the molten slag layer of an open hearth-type furnace in such a manner that the metal oxide dissolves in the slag and reduction to molten metal takes place in the slag layer. The molten metal is permitted to settle out of the upper slag layer into the lower molten metal layer. Thereafter the slag is circulated through a heating zone wherein it picks up the heat required for reduction and melting, whereupon the reheated slag is again contacted with the metal ore and reducing agent.

In this manner no separate reduction step is required, the same fuel may be used for heating and reducing the ore, low grade ores and reducing agents may be employed, and ore may be converted into finished steel in a single operation.

The ore may be supplied in its natural state or in a partially reduced form. For example, $Fe_2O_3$, $Fe_3O_4$ or $FeO$, or mixtures of these oxides may be used, preferably in a finely divided form.

Suitable reducing agents include such conventional reducing gases as hydrogen, carbon monoxide, gaseous or vaporous hydrocarbons, etc., as well as solid or semi-solid materials, such as oil residues, coal, peat, lignite, etc., or coke made from these materials.

When using a reducing gas it may be introduced into the slag either through the underlying layer of molten metal or directly without contacting the molten metal layer. These two methods are substantially equivalent if hydrogen is the reducing gas. However, when a carbonaceous gas, such as CO or a hydrocarbon gas, is used the effects obtained differ substantially.

Introduction of a carbonaceous reducing gas through the molten metal layer increases the carbon content of the metal by a reaction of the molten metal with the gas. As a result, the melting point of the metal is reduced, permitting lower melting temperatures and fuel savings, the reduction of the ore in the slag layer is assisted by the contact of the slag layer with the carbon dissolved in the metal layer, and the chemical reactivity of the residual reducing gas remaining after contact with the molten metal is increased. On the other hand, the metal recovered from the molten metal layer is of the type of pig iron rather than of steel.

None of these effects is obtained when the carbonaceous reducing gas is contacted directly with the slag layer and this method will be more useful whenever any one or more of these effects appear undesirable. In this case, it is preferred to contact the reducing gas with the slag immediately upon the latter's return from the heating zone because the slag temperature is highest at this point and the higher the temperature the higher is the rate of reduction.

The gas remaining after contact with the slag layer and reduction of the metal ore normally still contains substantial proportions of combustible constituents at a high temperature. In accordance with a preferred embodiment of the invention, this residual reducing gas may be used to transport the slag, after completion of ore reduction, metal melting and molten metal settling, from the main treating zone of the furnace to the heating zone to serve therein as a fuel for heat generation, as will appear more clearly hereinafter. Other uses of this residual gas include preheating and/or preliminary partial reduction of the incoming ore, preheating of other solid feed materials, etc.

Solid reducing agents may be introduced directly into the slag layer in the form of powder or lumps. Since these solids are normally lighter than the slag, special provisions should be made to force the solids through the molten slag as will appear hereinafter. The solid reducing agent need not have a high mechanical strength such as that of "metallurgical coke" because it does not have to support a high burden.

The metal oxide may be added together with the solid reducing agent in the form of suitable mixtures or briquettes, or the metal oxide may be added separately from the solid reducing agent. The first method has the advantage that some reduction may take place even before the ore reaches the slag. However, a careful control of the ratio of oxide to reducing agent is required in this case. If the oxide is in excess, oxide will be lost with the slag removed from the furnace. If reducing agent is in excess it will build up and slow down the operation. It is preferred, therefore, to combine both methods in such a manner that a small excess of reducing agent is supplied together with the ore in the form of a mixture or briquettes and additional ore is added separately to the slag at a suitable point so as to control the oxide concentration of the slag at a desired level. Additional oxide may also be added to the melting and settling zone intermediate between reducing and heating zones in order to adjust the carbon content of the molten metal.

The gases resulting from the reaction between ore and solid reducing agents may be utilized in substantially the same ways as outlined before in connection with the reacted reducing gases.

Slagging ingredients such as limestone or the like may be added at various points of the system. Addition to the heating zone is preferred because the necessary preheat and heat of decomposition may thus be applied directly rather than by slag circulation and the $CO_2$ evolved from raw slagging materials may be removed with the flue gases from the heating zone and thus prevented from consuming valuable reducing agent and heat in the main treating zone of the furnace. When added to the main treating zone, the evolution of $CO_2$ will aid in the stirring and mixing of the materials to be treated and/or in a reduction of the carbon content of the molten metal, depending on the exact point of addition. In certain cases these desirable effects may compensate somewhat for the loss of reducing agent and may make this type of addition or a combination of this type with addition to the heating section appear attractive.

In accordance with a further embodiment of the invention, fresh ore may be added to the heating zone. In this manner, sensible heat may be supplied directly to the ore by a combustion taking place in the heating zone, whereby the amount of heat to be supplied by circulating slag may be substantially reduced.

Further and more specific features and advantages of the invention will appear from the following detailed description of the accompanying drawing in which Figure 1 is a longitudinal horizontal section of a furnace according to the present invention, along the lines B—B of Figure 2;

Figure 1:
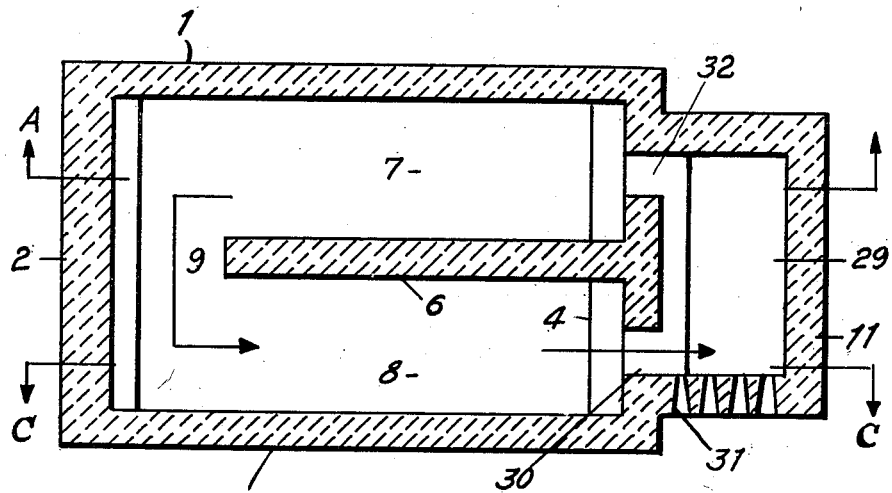

Before describing the drawing in detail, it may be observed that no attempt is made in the drawing to supply details of constructional features which are common in open hearth furnaces. Wherever possible the construction of the furnace is represented schematically, the purpose being merely to illustrate the features of the present invention. Aside from these features, the furnace may be assumed to be similar to the conventional open hearth furnace.

Figure 2:
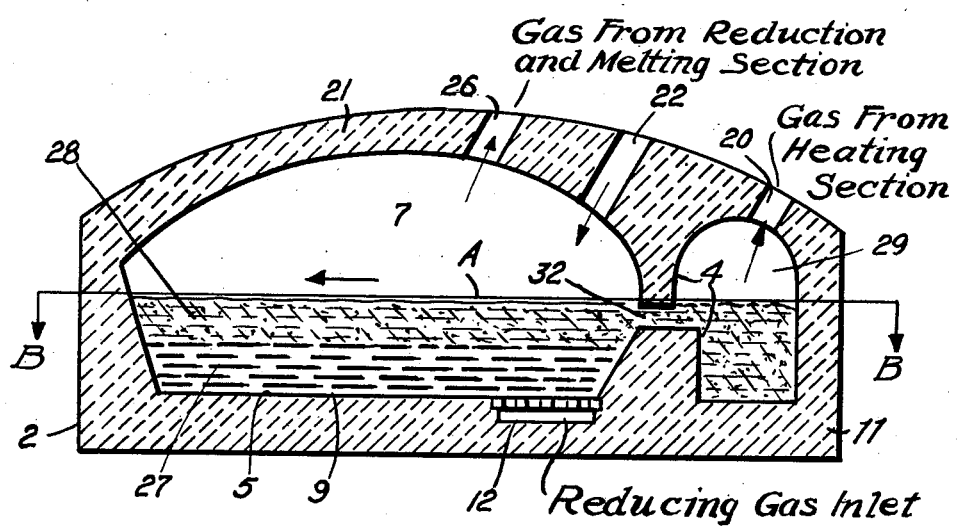
Figure 2 is a longitudinal vertical section of the same furnace along the lines A—A of Figure 1.

Referring to Figures 1 and 2, the numerals 1, 2, 3, and 4 designate the four walls of the furnace defining the bed 9. Arranged substantially down the middle of the furnace is an upright wall 6 which extends from wall 4 more than half the length of the furnace to a point intermediate the center of the furnace and wall 2, rising from the bed 9 of the furnace preferably to its closed roof 21 and dividing the bed into two sections 7 and 8. In the bed 9 of the furnace at a location close to wall 4, a row of reducing gas inlets 12 is provided which extends over substantially the entire width of section 7. A chamber 29 is provided behind wall 4, this chamber being substantially coextensive with the main body of the furnace.

That portion of wall 4 which is in section 8 is provided with a transverse slot or opening 30 arranged so as to be in about the mid portion of the slag layer whereby slag continuously runs from the slag layer into the chamber 29. That portion of wall 3 which forms a wall of chamber 29 may be provided with a horizontal row of ports 31 so located as to normally be below the liquid level in chamber 29. These nozzles may be on the same level as, or above or below, the slot 30. That portion of wall 4 which is in section 7 has a port 32 slightly below the normal liquid level in section 7 and chamber 29 and the liquid level in chamber 29 will normally tend to be substantially the same as or substantially higher than that in section 7 of the furnace proper. The end wall 11 of chamber 29 is provided with an exhaust flue 20 which leads gases away from chamber 29.

Closely adjacent wall 4, the roof 21 of the furnace is provided with an inlet pipe 22 for powdered ore. Through this pipe additional quantities of slagging constituents, when required, may be introduced together with the ore. Also alloying constituents such as carbon and other metals may be introduced at this point. This pipe near its discharge end may be provided with a cooling jacket (not shown) which may extend through the roof. At a point of roof 21 further removed from wall 4 is an adjustable flue 26 which may serve to draw off gases evolved during the reducing and smelting operation or which may be utilized to feed in inert or reducing gases so as to provide a protective blanket over the molten mass.

It will be understood that the furnace is equipped with suitably arranged heating means, which constitute no part of the present invention, for bringing the furnace to reaction temperature. The furnace is charged in the usual manner so as to establish a lower layer 27 of molten metal and an upper layer 28 of slag.

Figure 3:
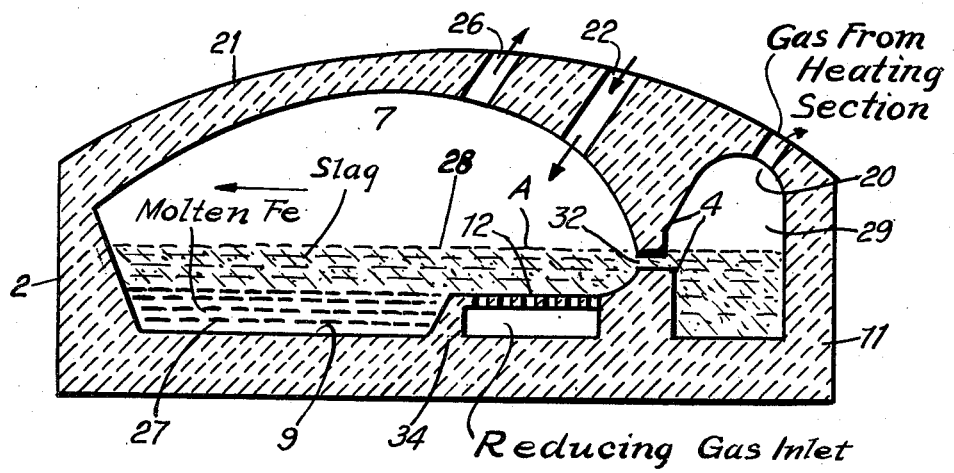
Figure 3 is a section similar to that of Figure 2, of a modified form of furnace according to the invention.

Referring now to Figure 3, the section shown therein is similar to that of Figure 2 with the exception of the location of the reducing gas feeding means 12, which is now arranged above and in spaced relationship to the bed 9 of the furnace at an elevation determined by a weir 34 extending across the width of zone 7 of the furnace. The top of weir 34 approximately coincides with the level of the molten metal layer 27 so that the reducing gas introduced through feeding means 12 passes only through slag layer 28.

Figure 4:
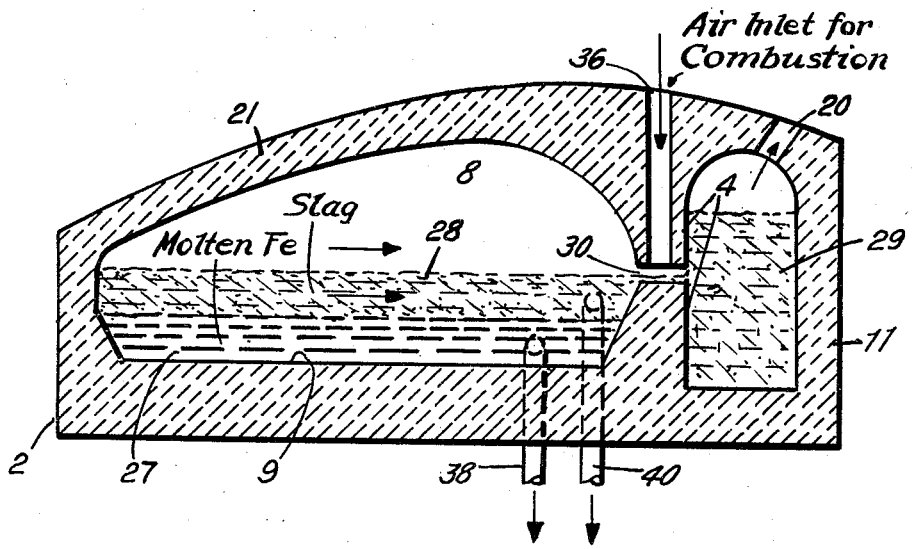
Figure 4 is a longitudinal vertical section of the furnace of Figure 1 along lines C—C, illustrating a further modification of Figures 1–3.

Figure 4 is a vertical longitudinal section through zone 8 of the furnace illustrating an embodiment of the invention which may be used in combination with either one of the modifications of zone 7 illustrated in Figures 2 and 3. Rear wall 4 of the furnace bed is provided in zone 8 with an elongated horizontal slot 30 connecting zone 8 with chamber 29 at such an elevation that the bottom of slot 30 will be within and its top just above the slag layer 28 when the furnace is in operation. A gas feed line 36 arranged in the furnace roof 21 connects slot 30 with a blower or pump (not shown) for the supply of an oxidizing gas such as air. Drawoff lines 38 and 40 serve the withdrawal of molten metal and excess slag, respectively.

The system illustrated by Figures 1, 2, and 3 may be operated as follows. To start up the furnace it may be charged with metal and slag and heated up to operating temperature so as to form molten metal and slag layers as indicated in the drawing. Line 26 may be closed and a reducing gas be admitted through feeding means 12 in the general manner known in the art of starting up Bessemer converters. Simultaneously, finely divided ore and any slagging ingredients needed may be charged through line 22 by any suitable feeding means, such as a standpipe, lockhopper, star feeder, etc. (not shown). The ore is dissolved in slag layer 28 and reduced therein to metal by contact with the reducing gas. The molten reduced metal settles through slag layer 28 into metal layer 27.

As a result of the continuous withdrawal of metal and slag through drawoffs 38 and 40 from the end of zone 8 both layers 27 and 28 move continuously in the direction of the arrow.

A portion of the slag is passed through port 30 into chamber 29 wherein it is heated and pumped as described in the copending application identified above. The heated slag in 29 flows through port 32 into section 7 and supplies the necessary heat for the reactions taking place in sections 7 and 8 of the furnace. The spent reducing gases withdrawn through port 26 may be used as heating gases for section 29 and for this purpose introduced through ports 31.

Figure 5:
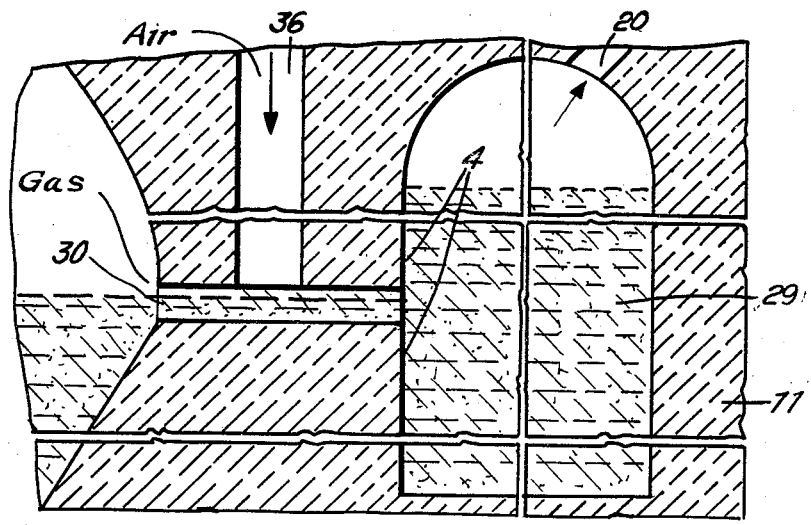
Figure 5 is an enlarged longitudinal horizontal section through element 30 of Figure 4.

Referring now to Figure 4, port 32 is covered by liquid and line 26 is closed, the gas remaining after reduction and still containing substantial proportions of combustible constituents is likewise forced in the direction of the arrow and through slot 30 into chamber 29. The velocity of this residual gas may be readily so controlled that a relatively strong flow of at least the upper strata of layer 28 takes place beyond drawoff 40 through channel 30 into chamber 29, as illustrated in greater detail in Figure 5 of the drawing. The relatively narrow cross-section of channel 30 aids in establishing a pumping action of the gas resulting in a strong current of slag from zone 8 into chamber 29. Depending on the gas velocity through, and the design of, port 30, this effect may be due to gas-liquid friction, slugging action, or spraying action, or to a combination of these causes.

Preferably preheated air admitted through pipe 36 is admixed with the gas in channel 30 to form a combustion mixture which burns in channel 30 or chamber 29 and heats the slag therein to the desired temperature. Flue gases are withdrawn through exhaust 20.

It is preferred to maintain in sections 7 and 8 a pressure substantially higher than that in chamber 29. This may be accomplished either by feeding the reducing gas at an increased pressure or by applying suction to exhaust 20, for example by connecting exhaust 20 to a suitable stack (not shown) or by any combination of these means. As a result of this pressure difference, the slag level in chamber 29 is higher than in zones 7 and 8 and the gases flowing through channel 30 bubble through a layer of liquid slag into chamber 29. In order to insure proper circulation of slag from the low pressure chamber 29 into high pressure zone 7, port 32 is preferably arranged at a lower level than slot 30, so that the liquid column above port 32 in chamber 29 is higher than that above slot 30. If desired, additional combustion gases, such as suitable mixtures of gaseous fuel with air, may be introduced through ports 31 into chamber 29.

For a better understanding of the embodiment of the invention illustrated in Figures 1–5, reference is made to the following operating details for a typical operation in a furnace of the type described with reference to Figure 4, in which iron ore is simultaneously reduced and melted.

*Example I*

I. Daily charge:
 A. Iron ore (52% Fe)—46 tons
 B. Natural gas—1,350,000 cubic feet (60° F.—1 atm.)
  $CH_4$—98%
  $N_2$—2%
 C. Limestone—25.3 tons (added to section 29)

Figure 6:
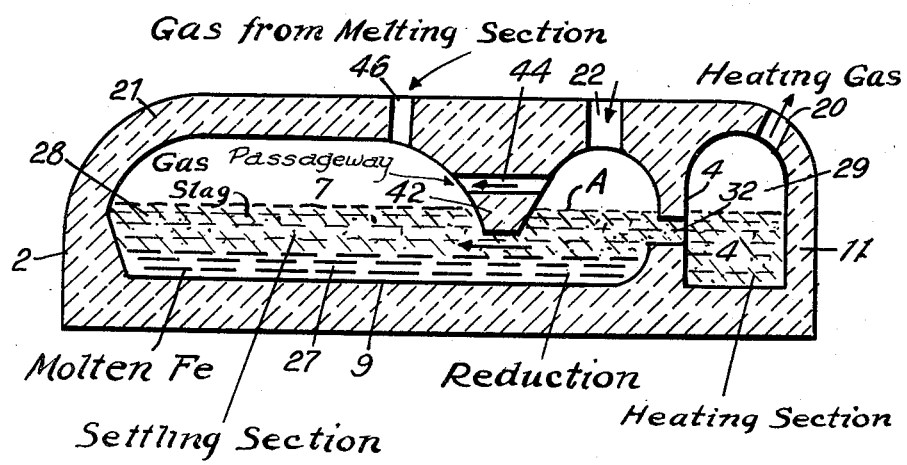
Figure 6 is a longitudinal vertical section of the type of Figures 2 and 3, illustrating another modification of the invention.

II. Daily production:
 Pig iron—22.3 tons
 Operating temperature—2600° F.
 Air preheat—1300° F.
 Operating pressure—
  Section 29, 1 atmosphere absolute
  Section 8, 16 inches $H_2O$ gauge The embodiment shown in Figure 6 is adapted to the use of a solid reducing agent in place of the reducing gas used in the systems of Figures 1–5. Figure 6, in which apparatus elements similar to those appearing in the preceding figures are identified by the same reference numerals, is a longitudinal vertical section through zone 7, similar to Figures 2 and 3, but modified to suit the special purpose of using solid reducing agents.

The construction of the furnace section illustrated by Figure 6 is substantially the same as that of Figures 2 and 3 with the following exceptions. Gas feeding means 12 are omitted. A bridge wall 42 extends from roof 21 downwardly to a point well within the intended slag layer 28, but above the level of metal layer 27, across the entire width of zone 7. Bridge wall 42 is arranged in close proximity to solids feed line 22. A gas passageway 44 penetrates bridge wall 42 in the direction of the longitudinal furnace axis at an elevation closely above the level of slag layer 28. Line 46 has the form of a solids feed line rather than that of a gas pipe.

In operation, the furnace may be started up substantially as outlined before. When the proper temperature is reached, ore and solid reducing agent, such as coal, coke, peat, lignite, etc., are fed through line 22 by suitable feeding means as outlined before. The solids may be fed either separately, or in the form of preformed mixtures or briquettes. Slagging ingredients may likewise be supplied through line 22.

Since the solid reducing agent is normally lighter than the slag it would swim on top of the slag layer and the contact with ore dissolving in the slag would be insufficient for an efficient reduction to take place. This difficulty is overcome by the arrangement of bridge wall 42. The slag and molten metal layers move continuously beneath bridge wall 42 in the direction of the arrow, impelled by metal and excess slag withdrawal through drawoffs 38 and 40 and by the pumping action of reaction gases passing through passageways 44 and 30 in the direction of the arrow. However, the solid reducing agent swimming on the slag is held up by bridge wall 42 and allowed to build up to a substantial height of, say, several feet above the slag level. As a result, a considerable portion of reducing agent is forced into the slag whereby proper contact with the dissolved oxides is accomplished. The solid reducing agent may even be forced all the way to the bottom of the furnace so that the molten slag and metal oxide filter through a bed of solid reducing agent whereby excellent contact and reduction are accomplished.

The gases evolved by the reduction reaction are forced through passageway 44 and pass through settling and reducing zones 7 and 8 and slot 30 into chamber 29, in the manner described in connection with Figures 1–5. The combustible constituents of the gas are burned in chamber 29 to supply at least a portion of the heat required by the process. Additional gas may be added to section 29 to supply additional heat.

If desired, additional metal ore may be added to the main section of zone 7 through line 46. In this manner, the oxide concentration of the slag and with it the carbon concentration of the metal, may be controlled at desired levels.

The following operating details will serve to further illustrate the embodiment of the invention described with reference to Figure 6.

*Example II*

I. Daily charge:
   A. Iron ore (52% Fe)—51 tons
   B. Coal (non-coking sub-bituminous)— 75 tons (½ added through 22, ½ used for producer gas employed in section 29)
      Total carbon, 55.5 wgt. per cent
      Hydrogen, 6.2 wgt. per cent
      Sulfur, 0.3 wgt. per cent
      Nitrogen, 0.8 wgt. per cent
      Oxygen, 33.9 wgt. per cent
      Ash, 3.3 wgt. per cent
      Fixed carbon, 43.1 wgt. per cent
      Volatile matter, 29.3 wgt. per cent
      Moisture, 24.3 wgt. per cent
      Heating value, 9,400 B. t. u./pound (as received basis)
   C. Limestone—26 tons (added to duct 22)
II. Daily production:
   Pig iron—25 tons
   Operating temperature—2700° to 2800° F.
   Operating pressure—1 atmosphere
   Air preheat—1300° F.

It is noted that in all embodiments of the invention described above, the location of the reduction zone A should be in closest proximity to chamber 29 in order to insure most efficient heat utilization and highest reduction rates. The gases leaving the reduction zone A may be, wholly or in part, passed up line 22 countercurrently to the solids charged in order partially to reduce the ore and to preheat all solids charged through line 22. Particularly in this case, it may be desirable to feed additional combustion gases through ports 31 as indicated in Figure 1, in order to supply the necessary amount of heat and to aid in the proper circulation of the slag. Flue gases from line 20 may be recycled to the system for similar purposes.

Special provisions may be made for the addition of slag and/or metal ore directly to chamber 29. In this manner, the heat required to preheat and decompose the slag and to preheat the ore may be applied directly rather than by circulating slag, and the $CO_2$ evolved by slag decomposition is kept away from the reducing zone. Substantial savings in reducing agent and fuel requirements may be secured by this modification. Fresh slagging ingredients should be added directly to zone 7 only if this appears desirable for the control of the carbon content of the metal and/or because of the stirring action of the $CO_2$ evolved.

It will be apparent that the method and apparatus illustrated are amenable to considerable change in detail without suffering any change in essential character. While the particular embodiments illustrated possess many unique features of construction and arrangement of parts, it is possible to design a suitable apparatus entirely different in appearance and general organization from that illustrated while still utilizing the principle of supplying heat to the reducing and smelting operation by circulating slag through a separate heating zone and returning it to the furnace bed. Such changes in design and arrangement are contemplated within the scope of the present invention.

The foregoing description has been more specifically directed to the reduction and purification of iron ores. It will be appreciated that the principles underlying the method described are applicable to any case where an ore the metal of which is highly reactive with oxidizing gases at elevated temperature is to be purified by smelting.

While the foregoing description and exemplary operations have served to illustrate specific applications and results, the invention is not limited thereto. Only such limitations should be imposed on the invention as are indicated in the appended claims.

What is claimed is:

1. A method for reducing oxidic ores of metals highly reactive with oxidizing gases at elevated temperatures, which comprises establishing a layer of said metal in molten form covered by a layer of molten slag, continuously withdrawing slag from said slag layer, heating said withdrawn slag by contact with combustion gas containing oxidizing constituents in a separate zone, returning the heated slag to the molten slag layer, so as to furnish the heat supply required for reducing and melting said ores, continuously feeding oxidic metal ore to said slag layer, continuously feeding a reducing agent to said molten slag layer, whereby metal ore is reduced to molten metal in said molten slag layer, settling reduced molten metal from said slag layer into said metal layer prior to the passage of said withdrawn slag to said separate zone, and recovering reduced molten metal from said metal layer.

2. The method of claim 1 in which gases remaining after the reaction between said ore and said reducing agent are burnt to supply heat to said separate zone.

3. The method of claim 1 in which said reducing agent is originally a gas.

4. The method of claim 3 in which said reducing gas is supplied directly to said slag layer.

5. The method of claim 1 in which said reducing agent is originally a gas and said reducing gas is introduced into said metal layer and passed from said metal layer into said slag layer.

6. The method of claim 1 in which said reducing agent is originally a carbonaceous solid.

7. The method of claim 6 in which said solid is supplied in subdivided form to said slag layer.

8. The method of claim 7 in which said solid is supplied in such amount that it builds up through a substantial portion of the depth of said molten slag layer and said molten slag layer is forced through said built up solid.

9. The method of claim 1 in which said reducing agent is originally a hydrocarbon gas and said hydrocarbon gas is introduced directly into said slag layer at a point in close proximity to the point at which said heated slag is returned to said molten slag layer.

10. The method of claim 1 in which said reducing agent is originally a carbonaceous solid and said ore and solid are charged together in the form of preformed mixtures.

11. The method of claim 10 in which said mixtures contain excess reducing agent and additional ore is supplied to said molten slag layer after reduction has taken place in said slag layer.

12. The method of claim 1 in which slagging ingredients are added to said separate zone.

13. The method of claim 1 in which fresh ore is added to said separate zone.

14. The method of claim 1 in which said ore is an oxidic iron ore.

15. A method for smelting oxidic iron ores, which comprises passing a molten slag layer through a circuitous path comprising a reducing zone, a settling zone and a heating zone, in the order stated, supplying subdivided ore and a reducing agent to said slag layer in said reducing zone, maintaining in said reducing zone a temperature adapted to melt and promote reduction of said ore in said slag layer in said reducing zone, settling molten reduced iron from said slag layer on its path through said reducing and settling zones to form a lower molten iron layer, recovering reduced molten iron from said settling zone, contacting said slag layer with hot combustion gases in said heating zone to heat the slag so as to furnish the heat supply required for reducing and melting said ores, and returning slag so heated to said reducing zone.

16. The method of claim 15 in which gases produced in said reducing zone are mixed with oxidizing gas, passed together with said slag to said heating zone, and burnt to generate heat required in said heating zone.

17. The method of claim 15 in which an extraneous fuel gas and an oxidizing gas are supplied to said heating zone to generate by combustion heat required therein.

18. The method of claim 15 in which the liquid level in said heating zone is substantially higher than that of said settling zone.

19. The method of claim 15 in which the liquid level in said reducing zone is higher than that of at least a portion of said settling zone.

20. The method of claim 15 wherein a substantially higher pressure is maintained in said reducing and settling zones than in said heating zone.

21. The method of claim 15 in which gases produced in said reducing zone are mixed with an oxidizing gas, said slag is pumped from said settling zone to said heating zone through a confined, extended narrow path with a hot mixture of produced and oxidizing gas and said hot mixture of produced and oxidizing gas is burned to generate heat required in said heating zone.

22. In the method of melting metalliferous solids by passing liquid slag through a substantially horizontal circuitous path comprising a melting zone, a settling zone and a heating zone and supplying said solids to said melting zone at a point adjacent to said heating zone, the improvement which comprises pumping said slag from said settling zone to said heating zone through a confined extended narrow path with a stream of hot gases.

EDWIN R. GILLILAND.

REFERENCES CITED

The following references are of record in the file of this patent:

UNITED STATES PATENTS

| Number | Name | Date |
|---|---|---|
| 453,227 | Wilson | June 2, 1891 |
| 828,583 | Thiel | Aug. 14, 1906 |
| 894,383 | Imbert | July 27, 1908 |
| 914,622 | Wikstrom | Mar. 9, 1909 |
| 1,031,490 | Thomson | July 2, 1912 |
| 1,160,822 | Beckman | Nov. 16, 1915 |
| 1,313,309 | Mambourg | Aug. 19, 1919 |
| 1,328,636 | Loke et al. | Jan. 20, 1920 |
| 1,500,651 | Smith | July 8, 1924 |
| 1,535,109 | Davies | Apr. 28, 1925 |
| 1,647,608 | Corsalli | Nov. 1, 1927 |
| 1,868,666 | Langer | July 26, 1932 |
| 2,051,463 | Barker | Aug. 18, 1936 |